(No Model.)

W. F. E. CASSE.
LIQUID COOLING CAN.

No. 541,343.        Patented June 18, 1895.

WITNESSES.

INVENTOR:
W. F. E. Casse

BY Munn & Co.
ATTORNEYS.

THE NORRIS PETERS CO., PHOTO-LITHO., WASHINGTON, D. C.

UNITED STATES PATENT OFFICE.

WOLFF FREDERIK ENGELBRECHT CASSE, OF COPENHAGEN, DENMARK.

LIQUID-COOLING CAN.

SPECIFICATION forming part of Letters Patent No. 541,343, dated June 18, 1895.

Application filed November 2, 1894. Serial No. 527,714. (No model.)

*To all whom it may concern:*

Be it known that I, WOLFF FREDERIK ENGELBRECHT CASSE, civil engineer, of 16 Hartensiavej, Copenhagen, Denmark, have invented certain new and useful Improvements in Processes of and Apparatus for Preserving Milk, Cream, and other Liquids, of which the following is a specification.

The object of the invention is to provide an improved vessel for preserving and storing milk, cream and other liquids or food in a fresh condition.

The invention relates to vessels having a jacket adapted to contain ice, and it has been my aim to so improve such vessels as to prevent the water formed in the ice jacket by thawing, from coming in contact with the inner wall of the jacket until nearly all the ice is melted.

To this end my invention consists of certain features of construction that will be hereinafter described and claimed.

Reference is to be had to the accompanying drawings, forming a part of this specication, in which similar letters of reference indicate correponding parts in both the views.

Figure 1:
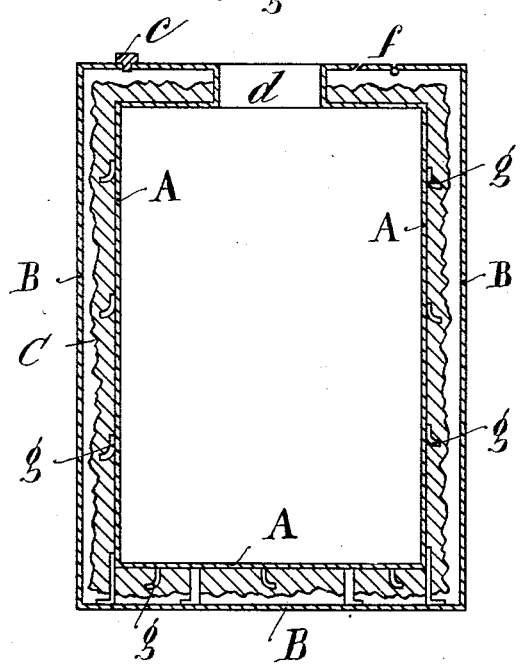
Figure 2:
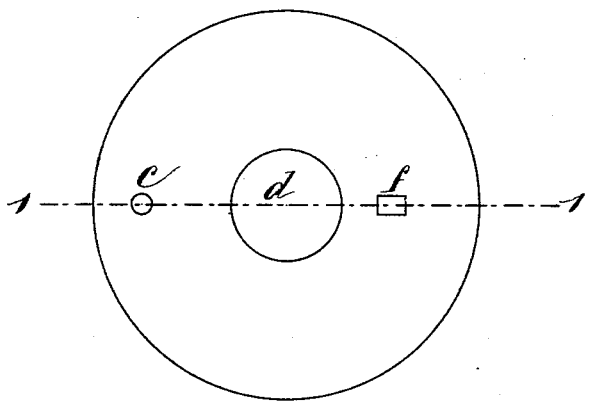

Figure 1 is a sectional side elevation of the apparatus on the line 1 1 of Fig. 2, and Fig. 2 is a plan view of the same.

The improved apparatus is provided with an inner vessel A, and an outer vessel B forming with the vessel A a space or jacket C, as is plainly illustrated in Fig. 1. The vessel A is preferably made of tin, but other suitable metal may be employed, and the outer vessel B is preferably surrounded by a heat insulating material, such as cork, felt, sawdust or the like.

The outer vessel B is provided with a plug c for filling the space or jacket C with water, the said vessel being further provided on top, with a small inwardly opening valve f for preventing the formation of a vacuum in the space C. The latter is charged with water through the opening for the plug c at the time the latter is removed, and this water is frozen there by means of an ice machine, or by a freezing mixture or other means, after which the plug c is inserted to close the opening.

The outer wall of the inner vessel A is provided with small projections or hooks g for holding ice fast to the exterior surface of the vessel A. When the freezing operation is finished, the milk, cream or other liquid is poured into the inner vessel through the neck d, after which the latter is closed by a suitable lid, cork or other stopper.

The ice which fills the jacket or space C between the inner and outer vessels A and B, gradually thaws from the outside, so as to leave the gradually melting, yet solid or continuous layer of ice on the outer surface of the inner vessel A. Although this layer of ice grows thinner, day by day, it will still form a continuous solid layer, as illustrated by Fig. 1, and thus keep milk, cream or other liquids contained in the vessel A, cold until the ice is about melted; and hence, the milk, cream or other liquid will keep unchanged for a long time. It would be quite different, if the space or jacket C were merely packed with pieces of ice and then the outer vessel surrounded by a heat insulating material. The same amount of ice will be thawed as in the former case, provided the insulation is the same, but the water gradually formed by the melting of the ice (by the excess of heat through the insulating material) will collect at the bottom, while the remaining pieces of ice will float on top and the melting will gradually proceed upward. The walls of the inner vessel will therefore be in contact with water as soon as any water is formed, and the area of the surface in contact with water will increase very rapidly, so that the inner vessel containing the milk, cream or other liquid, will in the course of a few days, stand in water and not in ice.

With every passing day, the larger part of the inner vessel will be surrounded by water, and this water will have a temperature which at all events will rise to some degrees above the freezing point, and consequently the milk or cream will therefore partly acquire about the same temperature, and thus become spoiled. It is only by providing a solid layer of ice around the whole of the inner vessel, that the result previously mentioned is obtained, that is, keeping the cream or milk at the freezing point, and in this respect it does not matter whether this layer of ice is very thick or thin.

It will be observed that the inner vessel will remain in contact with ice until nearly all of the ice has been used up as the thawing progresses inward from the outer vessel, and the ice is held to adhere to the inner vessel. These hooks or projections g which are located in the vertical part of the jacket prevent the ice from rising even after it has somewhat lost its cohesion or solidity by thawing, and thus preserves the continuity of the layer of ice on the inner wall of the jacket for a greater length of time than if no such hooks were provided.

Having thus fully described my invention, I claim as new and desire to secure by Letters Patent—

1. A vessel for preserving and storing milk, cream or other articles, provided with a surrounding jacket and ice-holding projections in the vertical part of the jacket to prevent rising of the ice, as and for the purpose set forth.

2. A vessel for preserving and storing milk, cream or other articles, provided with a surrounding jacket and ice-holding projections secured to the inner wall of the vertical part of the jacket and extending into the latter to prevent rising of the ice, as and for the purpose set forth.

In testimony that I claim the foregoing as my invention I have signed my name in presence of two subscribing witnesses.

WOLFF FREDERIK ENGELBRECHT CASSE.

Witnesses:
J. HOFMAN BAUG,
G. OLSEN HAUGE.